United States Patent
Shay

(10) Patent No.: US 12,519,849 B2
(45) Date of Patent: Jan. 6, 2026

(54) TECHNIQUES FOR SCALING AND MANAGING DATABASE QUERY PROCESSING

(71) Applicant: GONG.io Ltd., Ramat Gan (IL)

(72) Inventor: Zohar Shay, Even Yehuda (IL)

(73) Assignee: GONG.io Ltd., Ramat Gan (IL)

( * ) Notice: Subject to any disclaimer, the term of this patent is extended or adjusted under 35 U.S.C. 154(b) by 69 days.

(21) Appl. No.: 18/396,260

(22) Filed: Dec. 26, 2023

(65) Prior Publication Data

US 2025/0211631 A1    Jun. 26, 2025

(51) Int. Cl.
 *G06F 15/173* (2006.01)
 *H04L 67/1008* (2022.01)
 *H04L 67/104* (2022.01)
 *H04L 67/143* (2022.01)

(52) U.S. Cl.
 CPC ...... *H04L 67/1008* (2013.01); *H04L 67/1055* (2013.01); *H04L 67/143* (2013.01)

(58) Field of Classification Search
 None
 See application file for complete search history.

(56) References Cited

U.S. PATENT DOCUMENTS

| | | | |
|---|---|---|---|
| 9,462,427 B2 | 10/2016 | Patel et al. | |
| 10,275,270 B2 | 4/2019 | Singh et al. | |
| 10,432,460 B2 | 10/2019 | Li et al. | |
| 11,194,638 B1 | 12/2021 | Danilov et al. | |
| 11,743,116 B2 | 8/2023 | Singh et al. | |
| 11,797,197 B1 | 10/2023 | Karr et al. | |
| 2021/0392185 A1* | 12/2021 | Einkauf | H04L 67/10 |
| 2022/0156107 A1* | 5/2022 | Bafna | G06F 16/188 |
| 2022/0350633 A1 | 11/2022 | Aron et al. | |
| 2024/0192896 A1* | 6/2024 | Karr | G06F 3/0631 |

* cited by examiner

*Primary Examiner* — Wing F Chan
*Assistant Examiner* — Andrew Woo
(74) *Attorney, Agent, or Firm* — M&B IP Analysts, LLC

(57) ABSTRACT

A system and method for scaling management. A method includes determining at least one change in a number of virtualized nodes to be implemented based on service data related to servicing of requests by the virtualized nodes; adjusting capacities of at least one of the virtualized nodes based on the service data; and implementing the at least one change by modifying the number of virtualized nodes.

15 Claims, 7 Drawing Sheets

TECHNIQUES FOR SCALING AND MANAGING DATABASE QUERY PROCESSING

TECHNICAL FIELD

The present disclosure relates generally to database query processing, and more specifically to managing and scaling database query processing activities.

BACKGROUND

Scaling is used in order to handle increased demand to computing services. Accordingly, in the computing context, scaling involves assigning or otherwise allocating additional computing resources as needed based on demand in order to accommodate changes in demand (for example, a higher volume of requests). Effective scaling allows for optimizing use of computing resources while maintaining service quality and responsiveness.

Scaling is a technical challenge. Moreover, scaling virtualized resources can present additional logistical challenges that may inhibit scaling effectively. In particular, even when physical resources can be allocated in order to enable scaling, virtual workloads may need to be transferred in order to effectuate the scaling. These transfers can cause downtime as workloads are stopped and then restarted.

Thus, solutions which allow for accurately identifying the need for upscaling as well as solutions for minimizing downtime or other disruptions in service when scaling are desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for scaling management. The method comprises: determining at least one change in a number of virtualized nodes to be implemented based on service data related to servicing of requests by the virtualized nodes; adjusting capacities of at least one of the virtualized nodes based on the service data; and implementing the at least one change by modifying the number of virtualized nodes.

Certain embodiments disclosed herein also include a non-transitory computer readable medium having stored thereon causing a processing circuitry to execute a process, the process comprising: determining at least one change in a number of virtualized nodes to be implemented based on service data related to servicing of requests by the virtualized nodes; adjusting capacities of at least one of the virtualized nodes based on the service data; and implementing the at least one change by modifying the number of virtualized nodes.

Certain embodiments disclosed herein also include a system for scaling management. The system comprises: a processing circuitry; and a memory, the memory containing instructions that, when executed by the processing circuitry, configure the system to: determine at least one change in a number of virtualized nodes to be implemented based on service data related to servicing of requests by the virtualized nodes; adjust capacities of at least one of the virtualized nodes based on the service data; and implement the at least one change by modifying the number of virtualized nodes.

Certain embodiments disclosed herein include the method, non-transitory computer readable medium, or system noted above or below, wherein the capacities are defined with respect to connection limits, wherein adjusting the capacities includes modifying at least a portion of the connection limits.

Certain embodiments disclosed herein include the method, non-transitory computer readable medium, or system noted above or below, wherein the at least one change in the number of virtualized nodes includes terminating a first virtual node of the virtualized nodes, further including or being configured to perform the following step or steps: preventing subsequent queries from arriving at the first virtualized node; monitoring for completion of existing queries by the first virtualized node; and terminating the first virtualized node when all existing queries have been completed by the first virtualized node.

Certain embodiments disclosed herein include the method, non-transitory computer readable medium, or system noted above or below, further including or being configured to perform the following step or steps: unregistering the first virtualized node from a list of available virtualized nodes.

Certain embodiments disclosed herein include the method, non-transitory computer readable medium, or system noted above or below, further including or being configured to perform the following step or steps: instructing a proxy to avoid passing requests to the first virtualized node.

Certain embodiments disclosed herein include the method, non-transitory computer readable medium, or system noted above or below, further including or being configured to perform the following step or steps: publishing at least one first connection limit in a published list, wherein each virtualized node has a respective second connection limit, wherein the virtualized nodes are configured to read the published list and to set the respective second connection limits based on the published at least one first connection limit.

Certain embodiments disclosed herein include the method, non-transitory computer readable medium, or system noted above or below, further including or being configured to perform the following step or steps: updating a list of available virtualized nodes when the at least one change has been implemented, wherein the virtualized nodes are configured to read the list of available virtualized nodes and to send queries to destinations based on the list of available virtualized nodes.

Certain embodiments disclosed herein include the method, non-transitory computer readable medium, or system noted above or below, further including or being configured to perform the following step or steps: deploying at least one standby node, wherein the at least one standby node is used when demand exceeds available capacities of the virtualized nodes.

Certain embodiments disclosed herein include the method, non-transitory computer readable medium, or system noted above or below, wherein the service data includes at least one of: numbers of active connections, numbers of available connections, and numbers of waiting threads.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
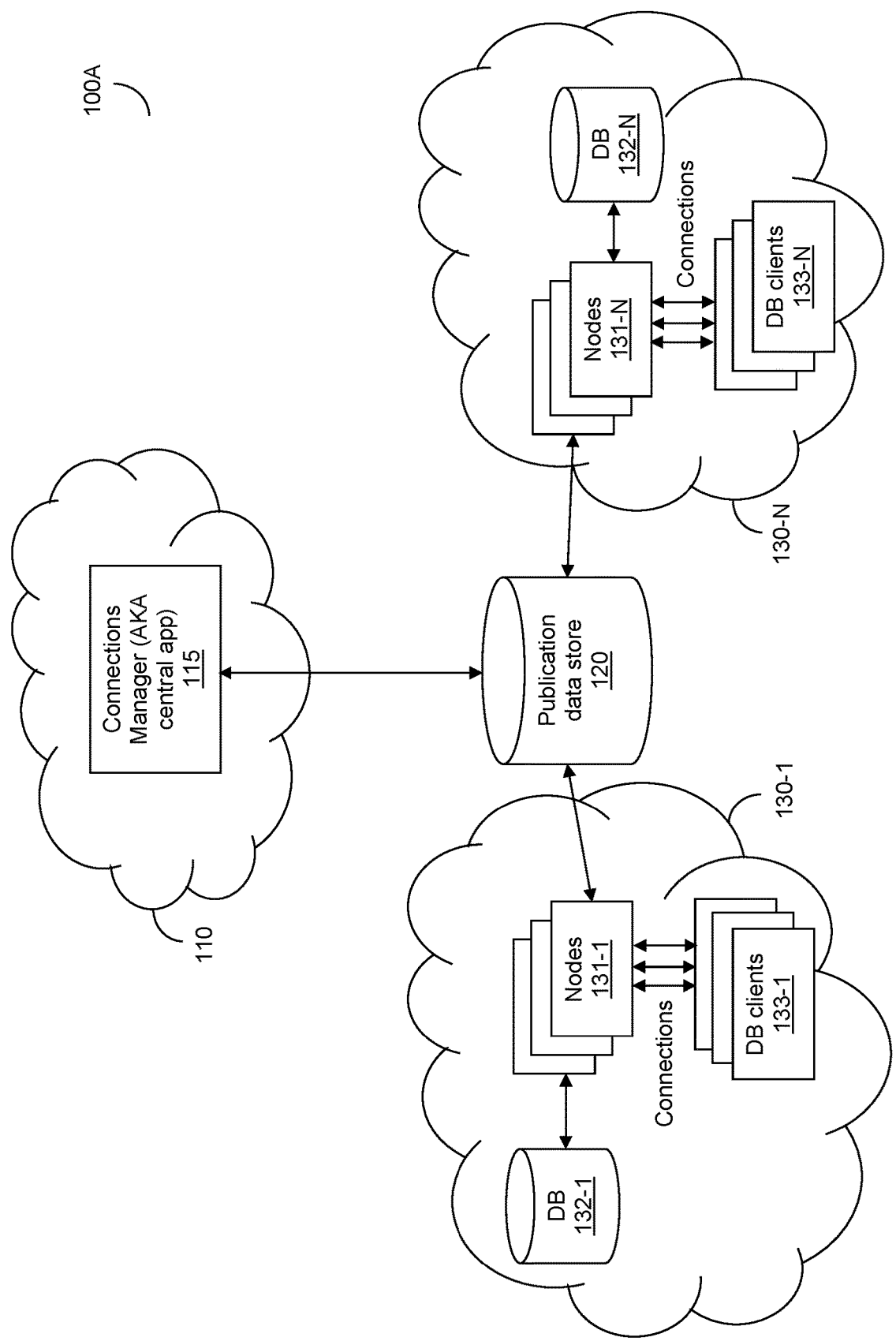
FIGS. 1A-B are network diagrams.

The various disclosed embodiments include techniques for scaling and, in particular, techniques which are suitable for managing nodes performing database operations. Various disclosed embodiments utilize a centralized system such as, but not limited to, a central software application (also referred to as central app). The centralized system is configured to manage scaling and capacities (for examples, capacities defined with respect to connection limits) of nodes performing database operations in order to allow for dynamic scaling while ensuring minimal (if any) downtime. The processes may be used for horizontal scaling (e.g., changing the number of instances or other nodes performing operations), vertical scaling (e.g., increasing the computing resources dedicated to nodes), or both. In particular, various techniques for controlling capacities may aid in ensuring that horizontal scaling can be performed effectively while minimizing downtime.

A centralized system may be integrated with one or more systems running nodes which might need to be scaled. The centralized system is deployed centrally relative to the nodes, i.e., such that the centralized system is not among the nodes and can manage the numbers of nodes. The nodes may be virtualized systems, for example, instances of virtual machines or other virtualized systems which can be scaled by adding or removing instances. Initial connection limits may be set, for example, at default values set per environment. Software may be deployed in environments where the nodes are deployed in order to monitor activity related to connections and servicing of requests, and to report such activity to the centralized system. Examples of reporting data include how many connections are active at different times, how many connections are open at different times, and how many waiting threads (i.e., parts of processes that are waiting to be executed) there are at different times.

Based on such reporting data related to the various nodes, scaling changes (e.g., addition or removal of nodes) are determined. The scaling changes are implemented, for example, by sending instructions to increase the number of nodes or to decrease the number of nodes. Capacities for the nodes may be set, for example as defined with respect to connection limits for the nodes (e.g., a connection limit per node, per cluster of nodes, per computing environment in which nodes are deployed, per customer, etc.).

In this regard, it is noted that some database node scaling techniques exist, but that these techniques are generally limited in that they can only scale vertically and cannot effectively scale horizontally. In particular, even when such techniques attempt to provide functionality for scaling horizontally, attempts to scale horizontally are often met with downtime due to issues such as the load growing faster than the upscaling allows for. Also, existing solutions do not account for future changes in load, and typically utilize predetermined capacity limits that are periodically adjusted and cannot adapt dynamically to changes in load before those changes happen. Some existing solutions may be capable of scaling automatically, but only based on analysis of load changes as they happen such that automatic upscaling often occurs after the increased demand has already passed.

Additionally, existing solutions which only effectively allow for scaling vertically are capable of increasing capacities of existing physical hosts, but face challenges in scaling appropriately when there are virtual workloads. Specifically, when virtual workloads are implemented, such existing solutions may need to transfer virtual workloads to new physical hosts during upscaling. However, transferring virtual workloads to new physical hosts can cause downtime. Further, these solutions generally do not support dynamically adjusting capacities in response to changes in demand in real-time.

The various disclosed embodiments provide techniques which allow for upscaling horizontally by increasing the number of nodes while avoiding downtime due to overwhelming the nodes as a result of increasing the load. Specifically, in certain versions noted above, a centralized system analyzes historical data in order to manage expected future capacities, thereby allowing for scaling out the number of nodes while avoiding overloading systems being operated on by the nodes (e.g., databases) or failing queries. The centralized system can manage the numbers of virtualized nodes in tandem with managing capacities of the nodes (e.g., connection limits) in order to ensure a smooth upscaling with minimal (if any) downtime. Use of a centralized system provides visibility into changes in demand which enable automated scaling and dynamic changes in capacities.

To further support the scaling back of nodes (i.e., decreasing the number of nodes), processes described herein also include techniques for winding down nodes in a manner that allows for decreasing the number of nodes without causing failures of queries which have yet to be processed. To this end, nodes to be wound down (i.e., nodes to be terminated once their queries are completed) are identified. Subsequent queries are prevented from arriving at the nodes, for example by unregistering the nodes from a list of potential destinations, instructing a proxy not to pass any more requests to the nodes, and the like. Activity by the nodes is monitored for completion of all existing queries, for example, until each node becomes idle. When a given node has completed all existing queries, the node may be terminated.

In this regard, it is noted that for many implementations such as instances of virtualized systems serving database queries, there is a high cost in terms of computing resources for establishing and maintaining connections. Accordingly, establishing and maintaining more connections than required in order to service requests involving database queries wastes computing resources such as random-access memory (RAM). Managing the capacities as discussed herein allows for gradually reducing the connection limits over time based on trends in past connection usage, which allows for optimizing the number of connections to ensure maximized service while minimizing use of computing resources to establish and maintain connections.

Moreover, it is also noted that scaling back by decreasing the number of nodes may lead to circumstances in which some nodes are terminated before they are finished processing queries in their queues. The winding down process discussed herein effectively allows for "draining" the queries, i.e., by preventing additional queries from being added to the queue while remaining queries are still being completed. This ensures that queries are not dropped or otherwise subject to downtime due to the nodes processing those queries being terminated prematurely.

Some embodiments also leverage publication by the centralized system in order to preserve status of instructions issued by the centralized system even if the centralized system fails. This allows for further avoiding downtime. To this end, the central nodes publishes changes in scaling (e.g., by updating a list of available nodes), changes in capacities (e.g., by updating a list of connection limits for certain nodes or groupings of nodes), or both. The published lists may be stored in a data store which is accessible to systems running the nodes such that those systems can implement the changes published by the centralized system even if the centralized system is down.

The centralized system described herein can also enable using standby nodes to further optimize costs. Such standby nodes may be instantiated and deployed before being used (i.e., at a time when no connections need to be established with those standby nodes) in order to ensure that sufficient capacity is available in the event of unexpected demand. By utilizing reporting data as discussed herein, the centralized system is configured to determine appropriate numbers and deployments of standby nodes in order to optimize availability without dedicating excessive resources to managing the standby nodes.

Figure 1B:
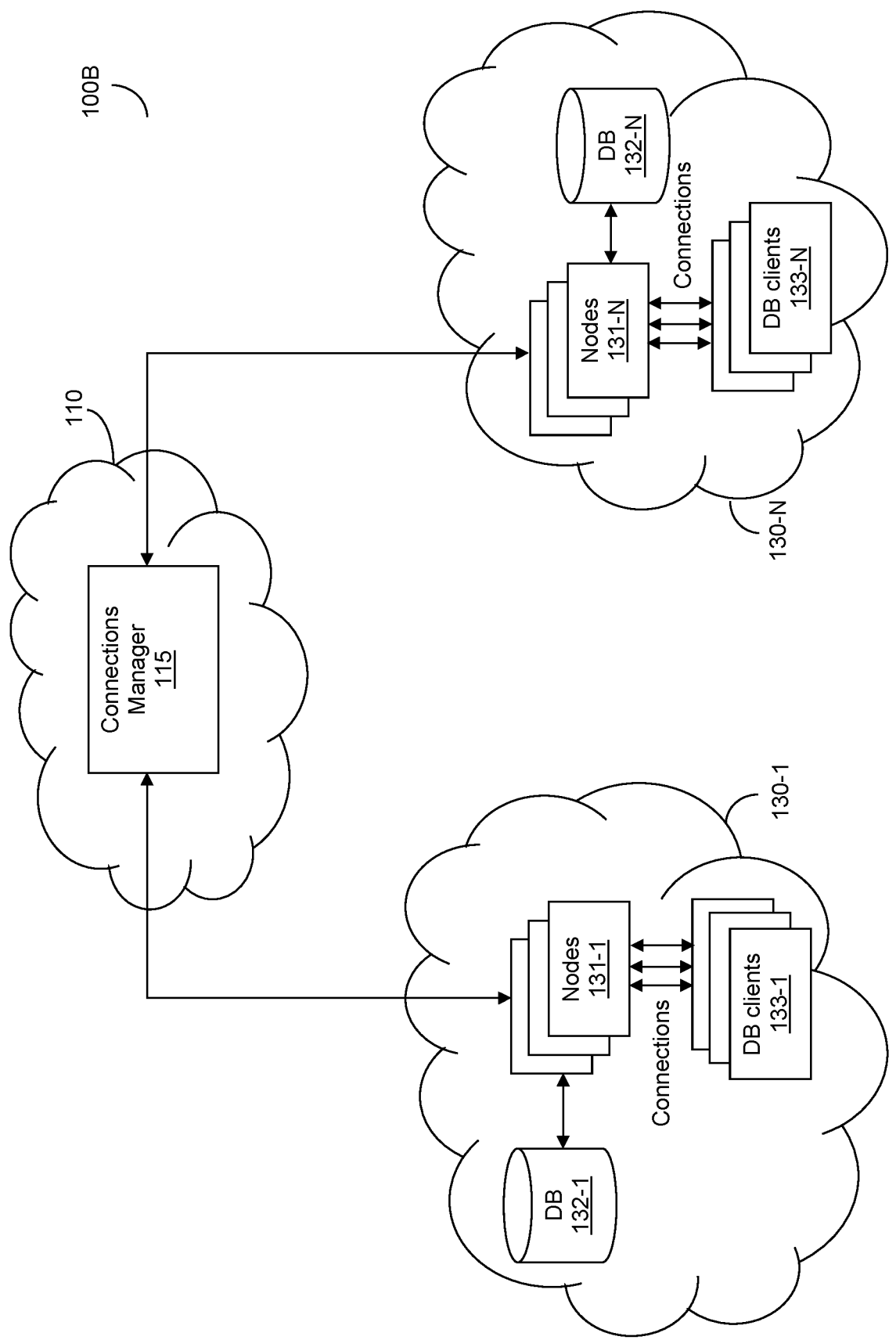

FIGS. 1A-B are example network diagrams 100A and 100B, respectively, utilized to describe various disclosed embodiments. In the network diagrams 100A and 100B, components in a first computing environment 110 and second computing environments 130-1 through 130-N (where N is an integer having a value equal to or greater than 1, referred to individually as a computing environment 130 or as computing environments 130 for simplicity) communicate, either through network communications between the respective computing environments or via posting to and reading from a publication data store 120 (as depicted in FIG. 1A).

The network communications may be conducted via one or more networks (not shown) such as, but not limited to, a wireless, cellular or wired network, a local area network (LAN), a wide area network (WAN), a metro area network (MAN), the Internet, the worldwide web (WWW), similar networks, and any combination thereof.

The first computing environment 110 may be or may include a computing environment utilized by a provider of scaling management services for controlling scaling in accordance with various disclosed embodiments. To this end, a connections manager 115 is deployed in the first computing environment 110. The connections manager 115 is configured to perform at least a portion of the disclosed embodiments such as, but not limited to, the processes described below with respect to FIGS. 2-4.

The connections manager 115 may therefore act, in accordance with various disclosed embodiments, as a centralized system managing scaling and capacities of the nodes 131. In such embodiments, the connections manager 115 is deployed in a centralized manner with respect to the nodes 131 of any or all of the second computing environments 130, i.e., such that the connections manager 115 is deployed externally to the nodes 131 rather than being among or incorporated into any of the nodes 131.

The second computing environments 130 may be or may include computing environments utilized by customers of the scaling management service or otherwise by entities using the scaling management service in order to help in automatically scaling to meet demand and to reduce capacity when demand wanes. To this end, each of the second computing environments 130 may include, but is not limited to, nodes 131, a database (DB) 132, and database clients 133.

The nodes 131 may be, but are not limited to, virtualized systems such as instances of virtual machines or other virtualized systems which can be scaled by adding or removing instances. The nodes 131 may comply with connection limits which may be initially set at, for example default values for the computing environment 130 in which each node 131 is deployed. The nodes 131 may be utilized to provide one or more computing services such that, when demand for those computing services change (e.g., by receiving more requests for those computing services), the number of instances of the nodes 131 may need to be increased in order to effectively serve the increased demand, or may need to be decreased in order to reduce unnecessary computing resource consumption.

The nodes 131 of each second computing environment 130 may communicate with the database 132 and the database clients 133 in the respective second computing environment 130. Each database 132 stores data which may be used, for example, to provide one or more of the computing services by the nodes 131. In this regard, at least some of the nodes 131 of each second computing environment 130 may act as reader nodes configured to access the database 132 in the second computing environment 130 in order to obtain and provide data requested by the database clients 133.

The database clients 133 may, in turn, be configured to process the data obtained from the database 132 in order to deliver services to one or more other devices or systems (not shown). To this end, the nodes 131 may establish connections with the database clients 133. Additional connections may be opened as additional requests are generated by the database clients 133 in order to serve those requests in parallel. In accordance with various disclosed embodiments, the connections between the nodes 131 and the respective database clients 133 may be managed by the connections manager 115 in order to, for example, cap the number of connections based on a number of instances of the nodes 131 in order to prevent system overload as well as to send instructions to increase the number of instances of the nodes 131 in order to accommodate increased demand.

Likewise, the connections manager 115 may send instructions to remove reader nodes when a number of connections between the nodes 131 and the database clients 133 is lower in order to reduce consumption of computing resources without interrupting running queries. In this regard, it is noted that there is often a high cost (in terms of computing resources) for establishing connections in database solutions. In some implementations, each connection may use a certain amount of random access memory (e.g., 4 megabytes of RAM).

Additionally, the connections manager 115 may reduce connection limits on demand, i.e., in response to predicted changes in demand. To this end, in accordance with various disclosed embodiments, the connections manager 115 may utilize historical connections data in order to gradually reduce connection limits, thereby reducing computing resource consumption while reducing vulnerability to sudden spikes in demand. Moreover, when the connections manager 115 is deployed centrally relative to the nodes 131, the connections manager 115 may leverage historical connections data both related to certain nodes or groups of nodes as well as to other nodes among the nodes 131, thereby allowing for more accurately predicting demand in order to manage connection limits and instances of the nodes 131 accordingly.

Further, in order to enable such functionality, in some embodiments code may be deployed in the second computing environments 130 (e.g., via the nodes 131) in order to provide connections data for use by the connections manager 115. Such code may include instructions for caching establishing connections and reporting data regarding such connections to the connections manager 115, for example, by sending the data from the nodes 131 to the connections manager 115 or by publishing such data to the publication data store 120. Such data may indicate, for example, how many connections are pending, which readers (i.e., which of the nodes 131) are available, both, and the like.

In the implementation depicted in FIG. 1A, the connections manager 115 publishes to the publication data store 120, and the nodes 131 read from data in the publication data store 120. For example, in accordance with various disclosed embodiments, the connections manager 115 may publish, by sending to the publication data store 120, a list of available nodes, a list of capacity-related information (e.g., a list of connection limits), instructions for how and when to pause queries, combinations thereof, and the like. The nodes 131 are configured to read such lists and to act accordingly, thereby effectuating at least a portion of the scaling (i.e., scaling out or otherwise increasing availability, scaling back or otherwise de-scaling, or both) as discussed herein.

As noted herein, publishing data in such a manner allows systems such as the nodes 131 to access the data to be used for effectuating scaling even if a centralized system that issues the publications (e.g., the connections manager 115) is down. Moreover, if one centralized system goes down, the published data may be used when the centralized system goes back online or when another centralized system is deployed in order to resume scaling management while minimizing the effects of any outages. Additionally, realizing scaling control via publishing may allow for performing at least some activities related to scaling management performed by the connections manager 115 to be performed using fewer processing and network resources as compared to more involved management involving controlling nodes 131 individually, thereby conserving computing resources.

In the implementation depicted in FIG. 1B, the nodes 131 of the second computing environments 130 may communicate directly (e.g., via one or more network connections) with the connections manager 115 of the first computing environment rather than the publish-read setup depicted in FIG. 1A.

Figure 2:
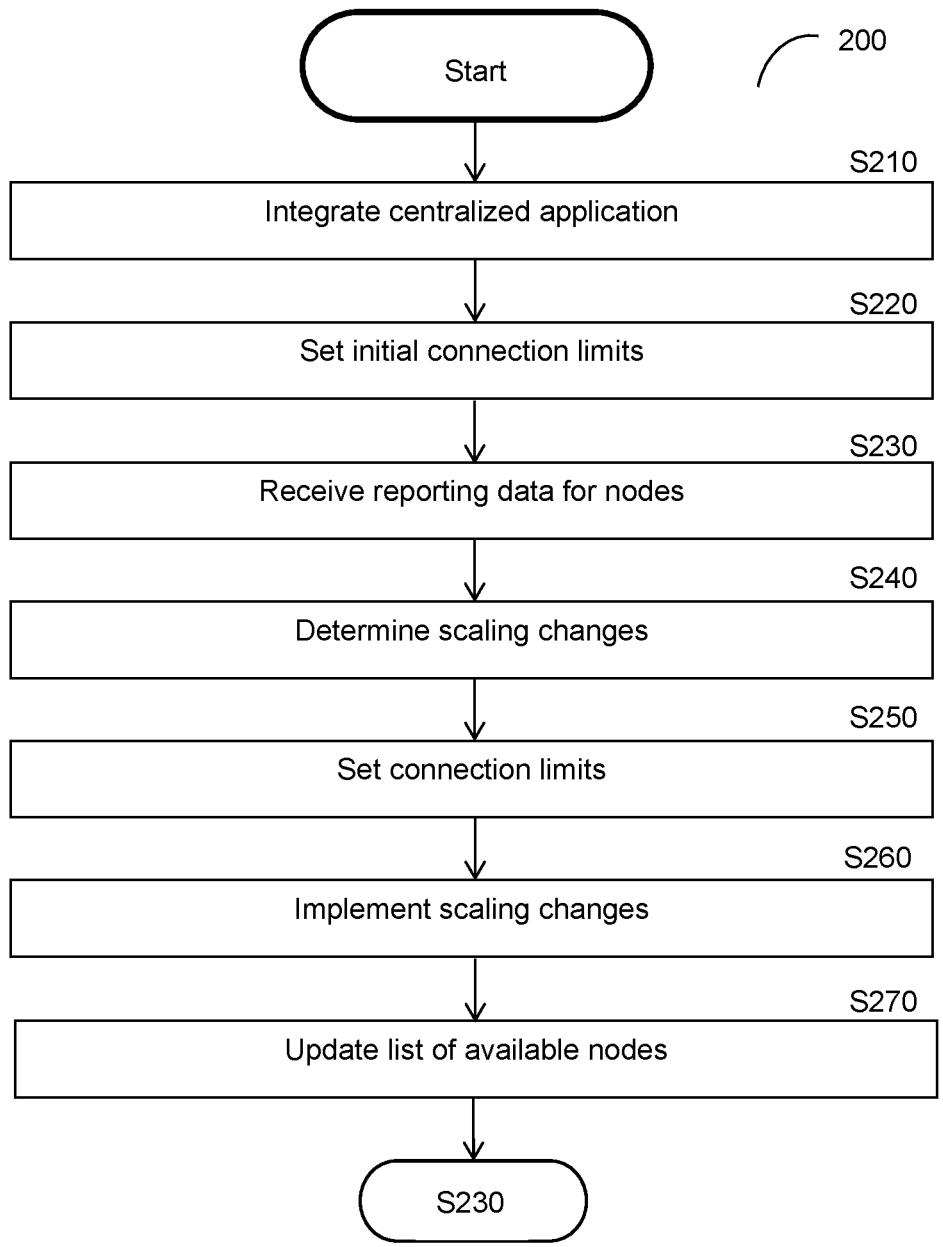
FIG. 2 is a flowchart illustrating a method for managing scaling.

FIG. 2 is a flowchart 200 illustrating a method for managing scaling. In an embodiment, the method is performed by the connections manager 115, FIGS. 1A-B.

At S210, a centralized application is integrated with one or more computing environments in which scaling is to be managed (e.g., via managing connections of nodes within those computing environments). The integration may include, but is not limited to, establishing communications with nodes in the computing environment or with a database that nodes in the computing environment have access to (e.g., the publication data store 120, FIGS. 1A-B). In an embodiment, the centralized system is deployed centrally relative to nodes whose connections are to be managed, i.e., such that the centralized system is not among the nodes and can manage the numbers of nodes.

In an embodiment, the integration further includes deploying software containing instructions that, when executed by a processing circuitry deployed in the computing environment (e.g., a processing circuitry of a system operating the nodes), configures the processing circuitry to generate and send reporting data. The reporting data may include, but is not limited to, how many connections are active at different times, how many connections are open at different times, and how many waiting threads (i.e., parts of processes that are waiting to be executed) there are at different times for each node.

At S220, initial connection limits are set. The initial connection limits may be predetermined default limits and may be set, for example, depending on the computing environment in which nodes abiding by each connection limit are deployed. For example, each computing environment may have a respective predetermined initial connection limit for nodes operating in that computing environment, and initial connection limits for nodes in that computing environment are set to the predetermined initial connection limit for that computing environment.

At S230, reporting data is obtained for nodes whose connection are managed. As noted above, the reporting data may include, but is not limited to, numbers of active connections, numbers of open connections, numbers of waiting threads, and the like. Accordingly, the reporting data may be used as historical connection data which may be utilized to make predictions about potential future demand and, consequently to make scaling decisions in order to accommodate that predicted future demand. The reporting data is utilized to make decisions regarding scaling such as, but not limited to, how many nodes are to be deployed (i.e., how many instances of virtualized components such as readers are to be used for servicing requests), capacities for those nodes (e.g., connection limits), both, and the like. As also noted above, in some embodiments, code may be deployed at computing environments where the nodes are deployed in order to generate and send the reporting data such that the system performing the method of FIG. 2 can access such reporting data.

At S240, scaling changes are determined. The scaling changes may include, but are not limited to, changing the number of nodes, changing capacities such as connection limits for the nodes, both, and the like. The scaling changes may be determined based on changes in demand (e.g., a number of requests to services such as requests received by the database clients 133, FIGS. 1A-B) or predicted future changes in demand, and may be determined based on the reporting data.

In some embodiments, S240 may include applying a machine learning model trained using a training set including historical demand data (e.g., training numbers of active connections, training numbers of open connections, training numbers of waiting threads, and the like). Such a machine learning model may be trained to output predicted future node requirements, connection requirements, or both, which in turn may be utilized to determine appropriate numbers of nodes and connection limits for servicing requests in accordance with those future requirements.

At S250, connection limits are set based on the determined scaling changes. In an embodiment, setting the connection limits includes sending data indicating the new connection limits to the nodes. In another embodiment, S250 includes publishing the new connection limits to a data store (e.g., the publication data store 120, FIGS. 1A-B). As noted above, publishing connection limits or other capacity data to such a data store may allow for maintaining continuity of scaling management even when the system performing the method of FIG. 2 is down as well as for accelerating resuming scaling management when such a system is back up or replaced with another system.

At S260, the determined scaling changes are implemented, i.e., such that a number of nodes is caused to be changed. The scaling changes may include scaling vertically (i.e., scaling up or scaling down), scaling horizontally (i.e., scaling out or scaling back), both, and the like. Scaling vertically may include, for example, adding more computing resources or reducing computing resources such as processing power, memory, storage, network speed, and the like. Scaling horizontally may include, for example, adding more machines (e.g., more virtual machines or database replicas) or reducing the number of machines.

In an embodiment, the determined scaling changes include changes with respect to the nodes, i.e., scaling the nodes vertically by increasing or decreasing computing resources allocated to the nodes or scaling the nodes horizontally by increasing or decreasing the number of nodes. In a further embodiment, implementing the scaling changes includes sending instructions to a computing environment in which each node is deployed, where the instructions are to modify the computing resources allocated to the nodes, the number of nodes, or both.

In another embodiment, the scaling changes may include deploying one or more standby nodes. Such standby nodes may be instantiated and deployed before being used (i.e., at a time when no connections need to be established with those standby nodes) in order to ensure that sufficient capacity is available in the event of unexpected demand. To this end, in such an embodiment, implementing the scaling changes further includes determining a number of standby nodes to be deployed. The number of standby nodes to be deployed may be determined so as to maximize the likelihood that standby nodes are available for surges in demand while minimizing excessive use of computing resources when standby nodes are not utilized, which may be determined based on the reporting data and predictions of future demand.

In some embodiments, when the determined scaling changes include scaling the nodes back horizontally (i.e., reducing the number of nodes), S260 includes instantiating a winding down process. In a further embodiment, the winding down process includes causing cessation of queries arriving at the nodes to be terminated and allowing the remaining queries to those nodes to be processed before terminating those nodes. This ensures that queries are not lost as nodes are terminated, thereby avoiding disruption of service requests using those queries. An example process for scaling back by winding down nodes is described further below with respect to FIG. 3.

At optional S270, a list of available nodes (e.g., a list published to a publication data store such as the publication data store 120, FIG. 1) is updated. In particular, when nodes are removed as part of implementing the scaling changes, the removed nodes may be removed from a current version of the list of available nodes in order to create an updated list of available nodes. By publishing the updated list of available nodes with the removed nodes being absent, the removed nodes effectively become invisible to services using the list of available nodes in order to determine where to send requests, thereby causing requests to cease being sent to those removed nodes. In other words, that instance of the virtualized component becomes unavailable as a viable host within a cluster.

In an embodiment, execution continues with S230, where additional reporting data is obtained in order to continue managing connections based on the additional reporting data.

Figure 3:
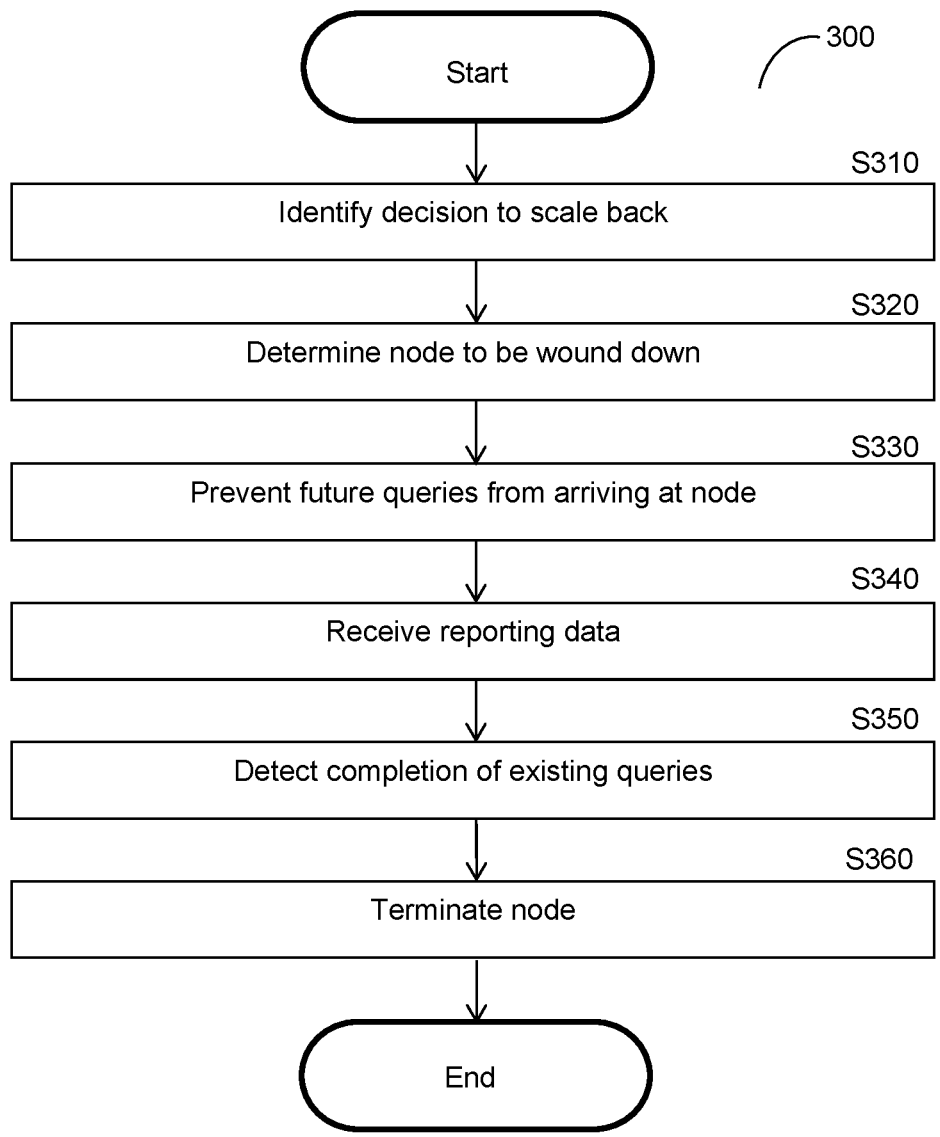
FIG. 3 is a flowchart illustrating a method for scaling back.

FIG. 3 is a flowchart 300 illustrating a method for scaling back. In an embodiment, the method is performed by the connections manager 115, FIGS. 1A-B. The method for scaling back may be used to effectively "drain" queries by winding nodes down so as to avoid disruption of servicing queries by those nodes while allowing for cessation of use of nodes.

At S310, a decision to scale back is identified. The decision to scale back is a decision to remove at least one node and may be determined, for example, as described above with respect to S240.

At S320, a node to be wound down is determined. The determined node is one of the nodes to be removed as part of the scaling back. In an embodiment, the node is a virtualized node.

At S330, future queries are prevented from arriving at the node determined at S320. In other words, action is taken such that queries cease being passed to the node or otherwise such that new queries no longer arrive at the node. In an embodiment, preventing queries from arriving at a node includes removing the node from a list of available nodes or otherwise unregistering the node such that services seeking to send requests will not recognize the node as a viable destination for those requests. In another embodiment, preventing queries from arriving at a node includes instructing a proxy (e.g., a domain name system [DNS] proxy) to avoid passing requests to the determined node.

At S340, reporting data is received with respect to the node. The reporting data is received from a system deployed with respect to the nodes. In an embodiment, the reporting data includes data about pending queries such as a status of each query (e.g., completed, pending, aborted, etc.) directed to the node. Such data may be utilized to verify that queries have been completed before terminating the node.

At S350, completion of existing queries directed at the node is detected based on the reporting data. As noted above, the reporting data indicates statuses of existing queries directed to the node. Accordingly, detecting completion of the queries may include determining whether all of the queries have been completed or otherwise not in need of being processed.

At S360, the node is terminated. Terminating the node may include, but is not limited to, sending an instruction to terminate the virtualized instance.

It should be noted that FIG. 3 depicts the process for terminating a single node for simplicity purposes, but that multiple nodes may be terminated in parallel without departing from the scope of the disclosure.

Figure 4:
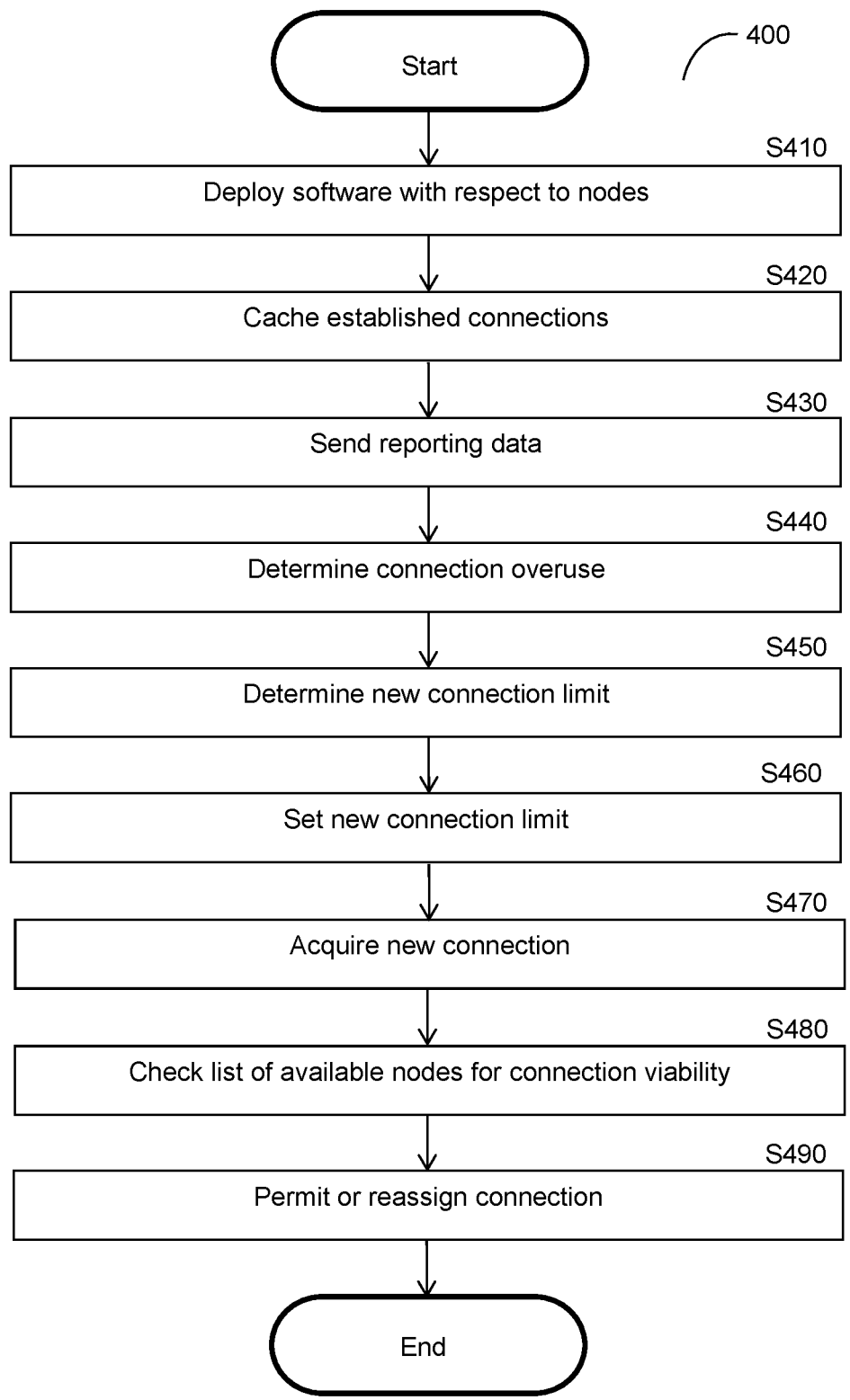
FIG. 4 is a flowchart illustrating a method for managing connections.

FIG. 4 is a flowchart 400 illustrating a method for managing connections. In an embodiment, the method is performed by a system deployed in a computing environment in which nodes whose connections are to be managed (e.g., a system on which the nodes 131, FIGS. 1A-B, are run).

At S410, software is deployed with respect to nodes whose connections are to be managed. In an embodiment, S410 includes sending executable code of the software to one or more computing environments in which the nodes whose connections are to be managed are deployed. In some embodiments, the software may be run by the nodes.

At S420, established connections are cached. More specifically data related to connections for one or more nodes is stored so that data may be reported and used for managing connections (e.g., by the connections manager 115, FIGS. 1A-B) as discussed above.

At S430, reporting data is sent to a location accessible to a system which manages node connections. The reporting data may be sent to such a system, or sent to a data store (e.g., the publication data store 120, FIGS. 1A-B) accessible to such a system. The reporting data may include or may be based on the connections data cached at S420.

At optional S440, connection overuse may be determined based on the reporting data. The connection overuse may be determined with respect to a potential local connection limit for certain nodes as compared to the actual number of connections used by those nodes. For example, connection overuse may be determined when a number of actual connections for nodes is regularly (e.g., a above a predetermined proportion of time) at or near (e.g., within a predetermined threshold) of a maximum connection limit (e.g., an externally set connection limit such as a limit set by the connections manager 115).

At S450, a new connection limit is determined. When connection overuse is determined at S440, the new connection limit may be a higher limit than a previous limit. Otherwise, the new connection limit may be a lower limit. The new connection limit may be a local connection limit that is within a maximum connection limit set externally (e.g., a connection limit established by the connection manager 115, FIGS. 1A-B). In this regard, the locally set new connection limit may be used in order to adjust connections based on current demand which, over time, can be reported back to a connections manager and used in order to determine that, for example, fewer connections are being used over time as compared to a connection limit set by that connection manager. This may allow for further fine tuning connection limits in order to optimize use of computing resources related to maintaining connection limits and providing the nodes which enable higher connection limits.

At S460, the new connection limit is set or otherwise established such that the total number of connections that a node may have at a given time are limited based on the new connection limit (e.g., such that the total number of connections between the node and a client does not exceed the new connection limit).

At S470, a new connection is acquired. The new connection is a connection to be established with a node, and may have a destination node to be used as the destination for requests transmitted via the new connection.

At S480, a list of available nodes is checked for connection viability. In other words, it is checked whether the new connection has a destination to an available instance. More specifically, it is checked whether the destination node for the new connection is among the list of available nodes. If so, it is determined that the new connection is viable for that destination node; otherwise, it is determined that the new connection is unviable with respect to that destination node.

At S490, the new connection is either permitted or reassigned based on the check for connection viability. For example, when it is determined that the new connection is viable with respect to the destination node at S480, the new connection is permitted. When it is determined that the new connection is unviable with respect to the destination node at S480, the new connection may be denied or reassigned to another destination node (e.g., a node among the list of available nodes checked at S480).

Figure 5:
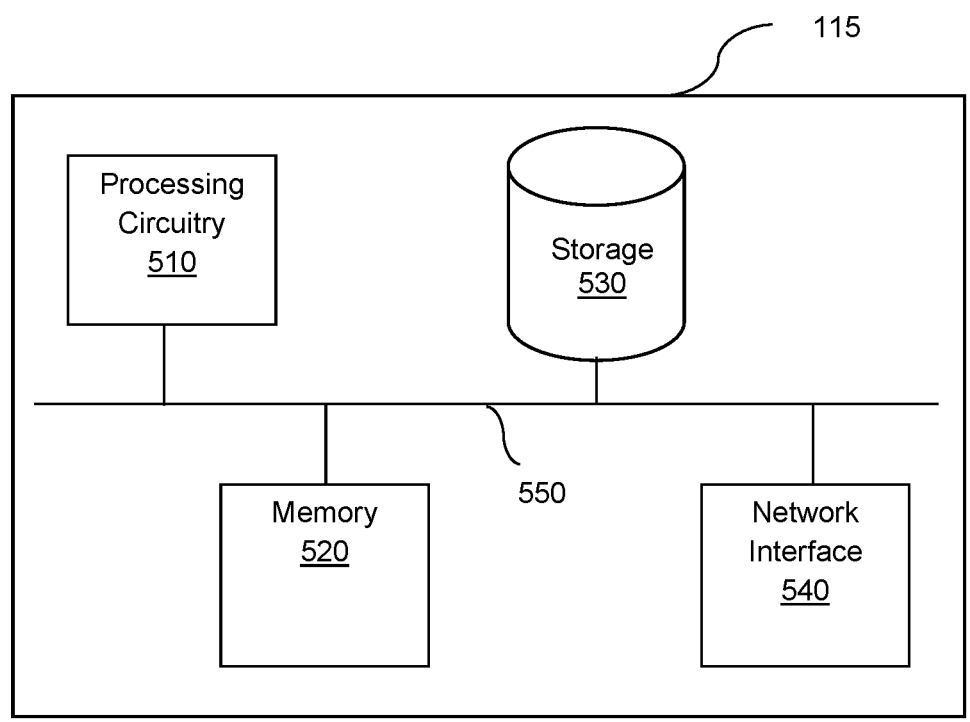
FIG. 5 is a schematic diagram of a connections manager.

FIG. 5 is a schematic diagram of a connections manager 115. The connections manager 115 includes a processing circuitry 510 coupled to a memory 520, a storage 530, and a network interface 540. In an embodiment, the components of the connections manager 115 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the communications manager 115 to communicate with, for example, the publication data store 120, the nodes 131, and the like.

Figure 6:
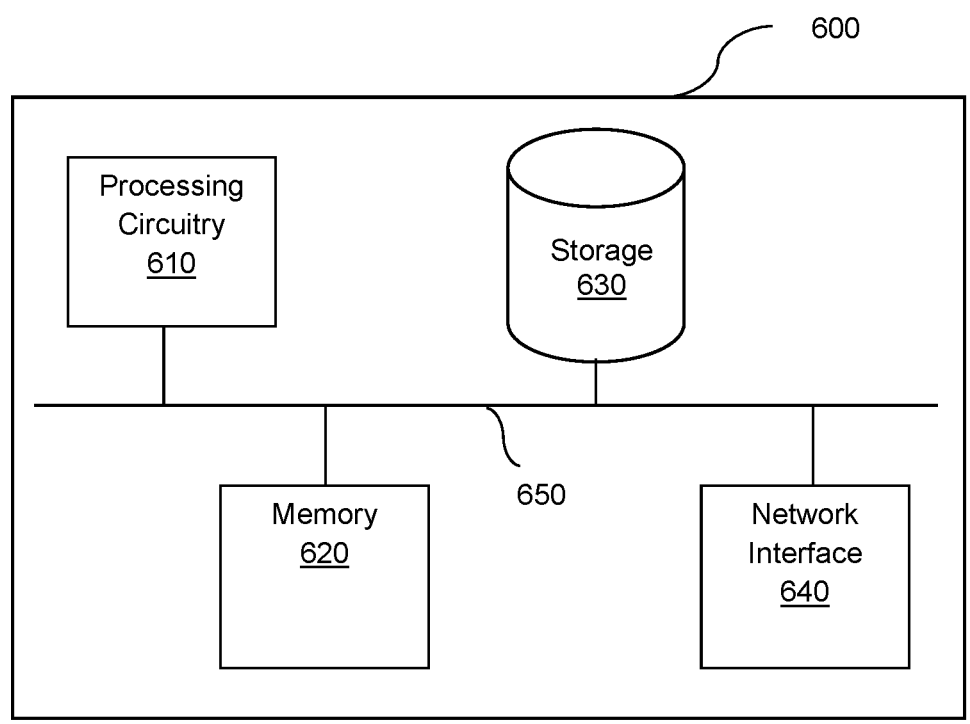
FIG. 6 is a schematic diagram of a hardware layer of a system which may be used to run nodes.

FIG. 6 is a schematic diagram of a hardware layer 600 of a system which may be used to run nodes. The hardware layer 600 includes a processing circuitry 610 coupled to a memory 620, a storage 630, and a network interface 640. In an embodiment, the components of the hardware layer 600 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the hardware layer 600 to communicate with, for example, the publication data store 120, the connections manager 115, the database 132, the database clients 133, and the like.

It should be understood that the embodiments described herein are not limited to the specific architecture illustrated in FIG. 6, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for scaling management, comprising:
    determining at least one change in a number of virtualized nodes to be implemented based on service data related to servicing of requests by the virtualized nodes;
    adjusting capacities of at least one of the virtualized nodes based on the service data, wherein the capacities are defined with respect to connection limits, wherein adjusting the capacities includes modifying at least a portion of the connection limits; and
    implementing the at least one determined change by modifying the number of virtualized nodes, wherein the at least one determined change in the modified number of virtualized nodes includes terminating a first virtual node of virtualized nodes, wherein terminating the first virtualized node includes:
        preventing subsequent queries from arriving at the first virtualized node;
        monitoring for completion of existing queries by the first virtualized node; and
        terminating the first virtualized node when all existing queries have been completed by the first virtualized node.

2. The method of claim 1, wherein preventing the subsequent queries from arriving at the first virtualized node further comprises:
    unregistering the first virtualized node from a list of available virtualized nodes.

3. The method of claim 1, wherein preventing the subsequent queries from arriving at the first virtualized node further comprises:
    instructing a proxy to avoid passing requests to the first virtualized node.

4. The method of claim 1, wherein adjusting the capacities of the at least one of the virtualized nodes further comprises:
    publishing at least one first connection limit in a published list, wherein each virtualized node has a respective second connection limit, wherein the virtualized nodes are configured to read the published list and to set the respective second connection limits based on the published at least one first connection limit.

5. The method of claim 1, further comprising:
updating a list of available virtualized nodes when the at least one determined change has been implemented, wherein the virtualized nodes are configured to read the list of available virtualized nodes and to send the subsequent queries to destinations based on the list of available virtualized nodes.

6. The method of claim 1, further comprising:
deploying at least one standby node, wherein the at least one standby node is used when demand exceeds available capacities of the virtualized nodes.

7. The method of claim 1, wherein the service data includes at least one of: numbers of active connections, numbers of available connections, and numbers of waiting threads.

8. A non-transitory computer readable medium having stored thereon instructions for causing a processing circuitry to execute a process, the process comprising:
determining at least one change in a number of virtualized nodes to be implemented based on service data related to servicing of requests by the virtualized nodes;
adjusting capacities of at least one of the virtualized nodes based on the service data, wherein the capacities are defined with respect to connection limits, wherein adjusting the capacities includes modifying at least a portion of the connection limits; and
implementing the at least one determined change by modifying the number of virtualized nodes, wherein the at least one determined change in the modified number of virtualized nodes includes terminating a first virtual node of virtualized nodes, wherein terminating the first virtualized node includes:
preventing subsequent queries from arriving at the first virtualized node
monitoring for completion of existing queries by the first virtualized node; and
terminating the first virtualized node when all existing queries have been completed by the first virtualized node.

9. A system for scaling management, comprising:
a processing circuitry; and
a memory, the memory containing instructions that, when executed by the processing circuitry, configure the system to:
determine at least one change in a number of virtualized nodes to be implemented based on service data related to servicing of requests by the virtualized nodes;
adjust capacities of at least one of the virtualized nodes based on the service data, wherein the capacities are defined with respect to connection limits, wherein adjusting the capacities includes modifying at least a portion of the connection limits; and
implement the at least one determined change by modifying the number of virtualized nodes, wherein the at least one determined change in the modified number of virtualized nodes includes terminating a first virtual node of the virtualized nodes, wherein the system is further configured to:
prevent subsequent queries from arriving at the first virtualized node;
monitor for completion of existing queries by the first virtualized node; and
terminate the first virtualized node when all existing queries have been completed by the first virtualized node.

10. The system of claim 9, wherein the system is further configured to:
unregister the first virtualized node from a list of available virtualized nodes.

11. The system of claim 9, wherein the system is further configured to:
instruct a proxy to avoid passing requests to the first virtualized node.

12. The system of claim 9, wherein the system is further configured to:
publish at least one first connection limit in a published list, wherein each virtualized node has a respective second connection limit, wherein the virtualized nodes are configured to read the published list and to set the respective second connection limits based on the published at least one first connection limit.

13. The system of claim 9, wherein the system is further configured to:
update a list of available virtualized nodes when the at least one determined change has been implemented, wherein the virtualized nodes are configured to read the list of available virtualized nodes and to send the subsequent queries to destinations based on the list of available virtualized nodes.

14. The system of claim 9, wherein the system is further configured to:
deploy at least one standby node, wherein the at least one standby node is used when demand exceeds available capacities of the virtualized nodes.

15. The system of claim 9, wherein the service data includes at least one of: numbers of active connections, numbers of available connections, and numbers of waiting threads.

* * * * *